Figure 1:
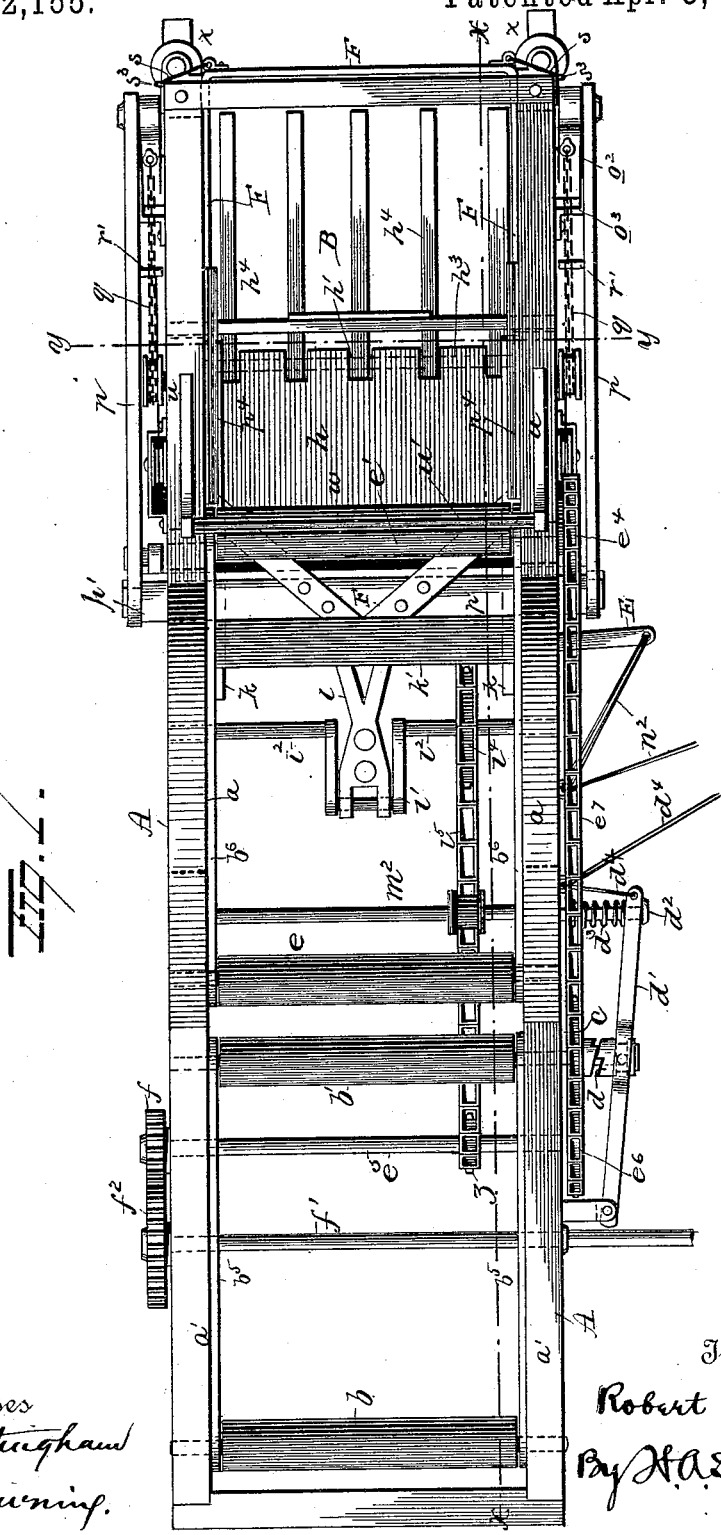

(No Model.) 5 Sheets—Sheet 1.

R. WOODS.
BUNDLE CARRIER AND SHOCKER.

No. 472,155. Patented Apr. 5, 1892.

Witnesses
C. J. Nottingham
G. F. Downing

Inventor
Robert Woods
By H. A. Seymour
Attorney (No Model.) 5 Sheets—Sheet 2.
R. WOODS.
BUNDLE CARRIER AND SHOCKER.

No. 472,155. Patented Apr. 5, 1892.

Witnesses
E. J. Nottingham
G. F. Downing

Inventor
Robert Woods
By H. A. Seymour
Attorney (No Model.) 5 Sheets—Sheet 4.
R. WOODS.
BUNDLE CARRIER AND SHOCKER.

No. 472,155. Patented Apr. 5, 1892.

Witnesses
E. L. Nottingham
G. F. Downing

Inventor
Robert Woods
By H. A. Seymour
Attorney

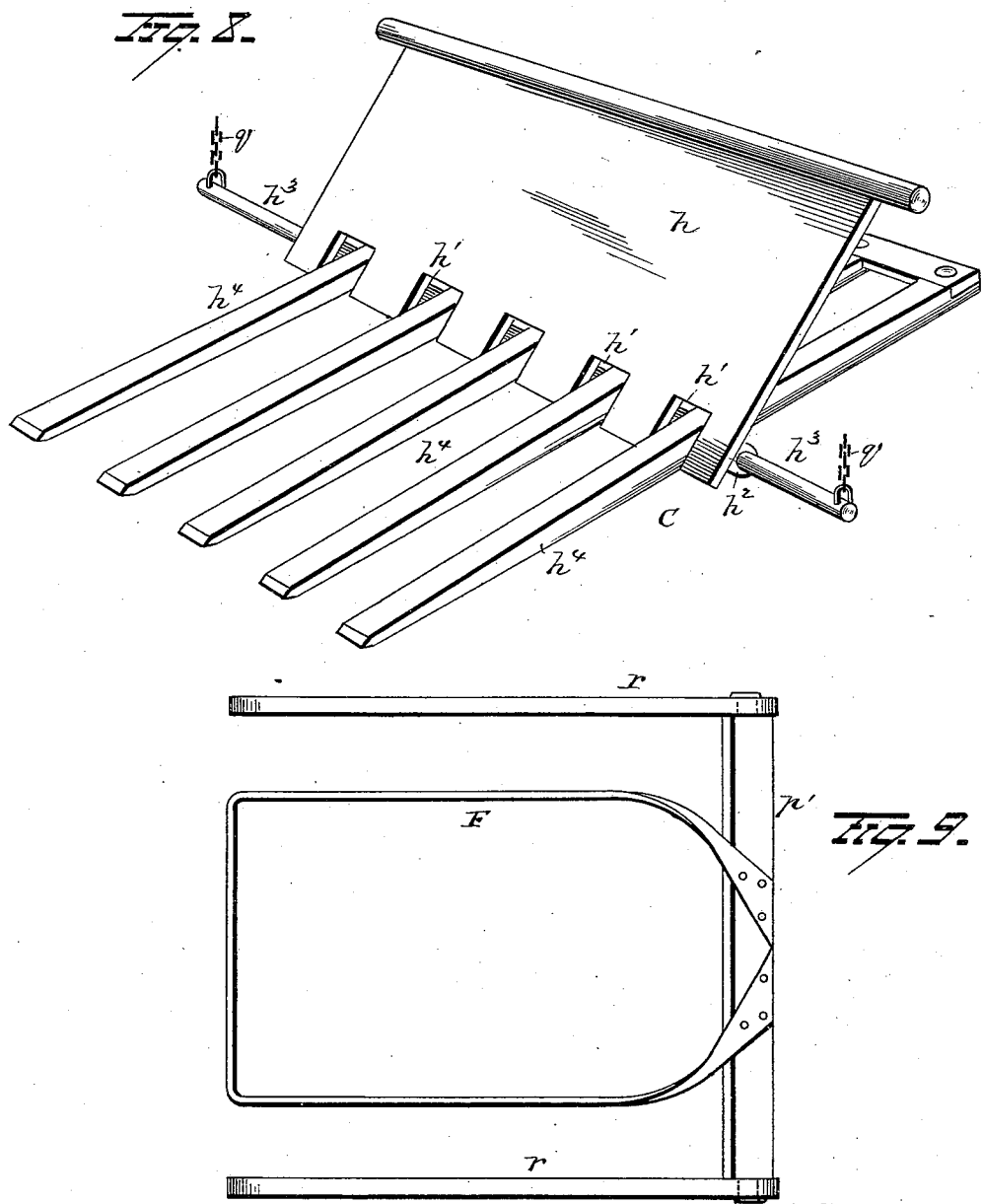

UNITED STATES PATENT OFFICE.

ROBERT WOODS, OF MINTO, NORTH DAKOTA, ASSIGNOR OF ONE-HALF TO JAMES GARBUTT AND ALFRED FIELD, OF SAME PLACE.

BUNDLE CARRIER AND SHOCKER.

SPECIFICATION forming part of Letters Patent No. 472,155, dated April 5, 1892.

Application filed March 11, 1891. Serial No. 384,637. (No model.)

*To all whom it may concern:*

Be it known that I, ROBERT WOODS, a citizen of Minto, in the county of Walsh and State of North Dakota, have invented certain new and useful Improvements in Bundle Carriers and Shockers; and I do hereby declare the following to be a full, clear, and exact description of the invention, such as will enable others skilled in the art to which it appertains to make and use the same.

My invention relates to an improvement in bundle carriers and shockers, its object being to produce a machine of simple construction whereby bundles of wheat or other grain will be carried from the binder to a box or receptacle and from the latter be deposited on the ground in shocks.

A further object is to construct the machine in such manner that when a suitable number of bundles of grain shall have been deposited therein said bundles will be compressed into a shock and delivered upon the ground in the form of shocks.

A further object is to produce a bundle carrier and shocker by means of which the bundles will be delivered into a box or receptacle and there packed or compressed in the form of a shock automatically and so that when a sufficient number of bundles of grain shall have entered said box or receptacle the shock thus formed will be automatically deposited on the ground.

A further object is to construct a bundle carrier and shocker in such manner that the bundles of grain will be delivered into a box or receptacle, automatically packed therein when a sufficient quantity shall have entered the receptacle to automatically deposit the shock thus formed, and so that the discharging mechanism will automatically reset itself.

A further object is to produce a bundle carrier and shocker which shall be automatic in its operation in shocking and depositing the bundles of grain and to also provide said machine with means whereby the operator can control the mechanism independent of its automatic operation.

A further object is to construct the machine in such manner that bundles of grain will be deposited in a receptacle in such position that when discharged it will be made to stand upright on the ground in the form of shocks.

A further object is to produce a machine of the class described which shall be comparatively simple in construction and effective in the performance of its functions.

With these objects in view the invention consists in the combination, with suitable conveyers and a box or receptacle, of means for directing bundles of grain into said box or receptacle and causing them to stand upright therein.

The invention further consists in the combination, with suitable conveyers and a receptacle, of means for directing bundles of grain therein in an upright position and means for automatically compressing said bundles of grain into a shock.

The invention also consists in the combination, with suitable conveyers and a receptacle, of means for directing bundles of grain into said receptacle in an upright position, means for automatically compressing said bundles of grain, and means for automatically releasing the shock thus formed.

The invention also consists in the combination, with suitable conveyers and a receptacle, of means for directing bundles of grain into the receptacle in an upright position, means for automatically compressing it into a shock, devices for automatically releasing said shock, and means for automatically resetting said releasing or dischraging mechanism; and the invention also consists in certain novel features of construction and combinations and arrangements of parts, as hereinafter set forth, and pointed out in the claims.

Figure 2:
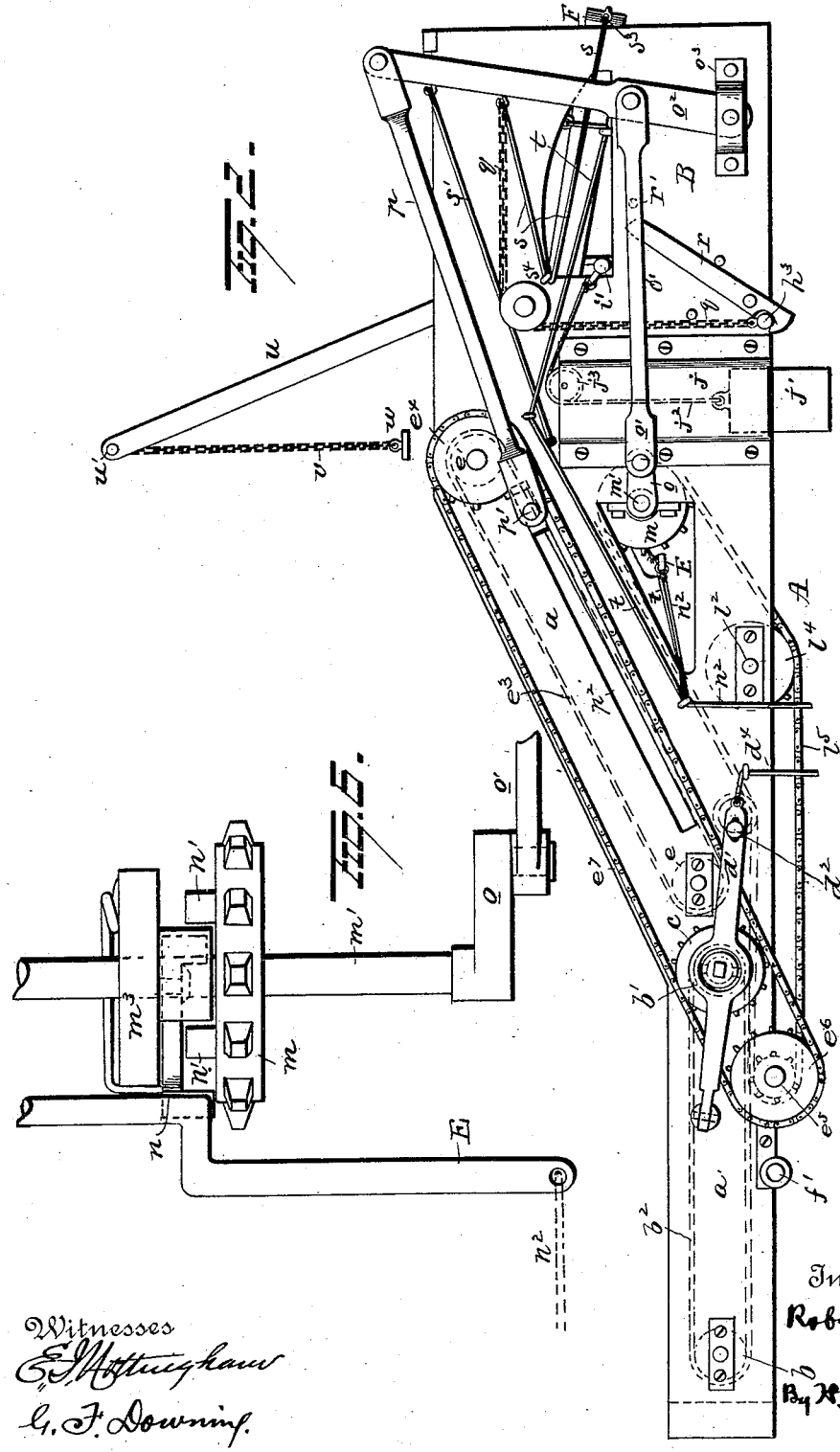
Figure 3:
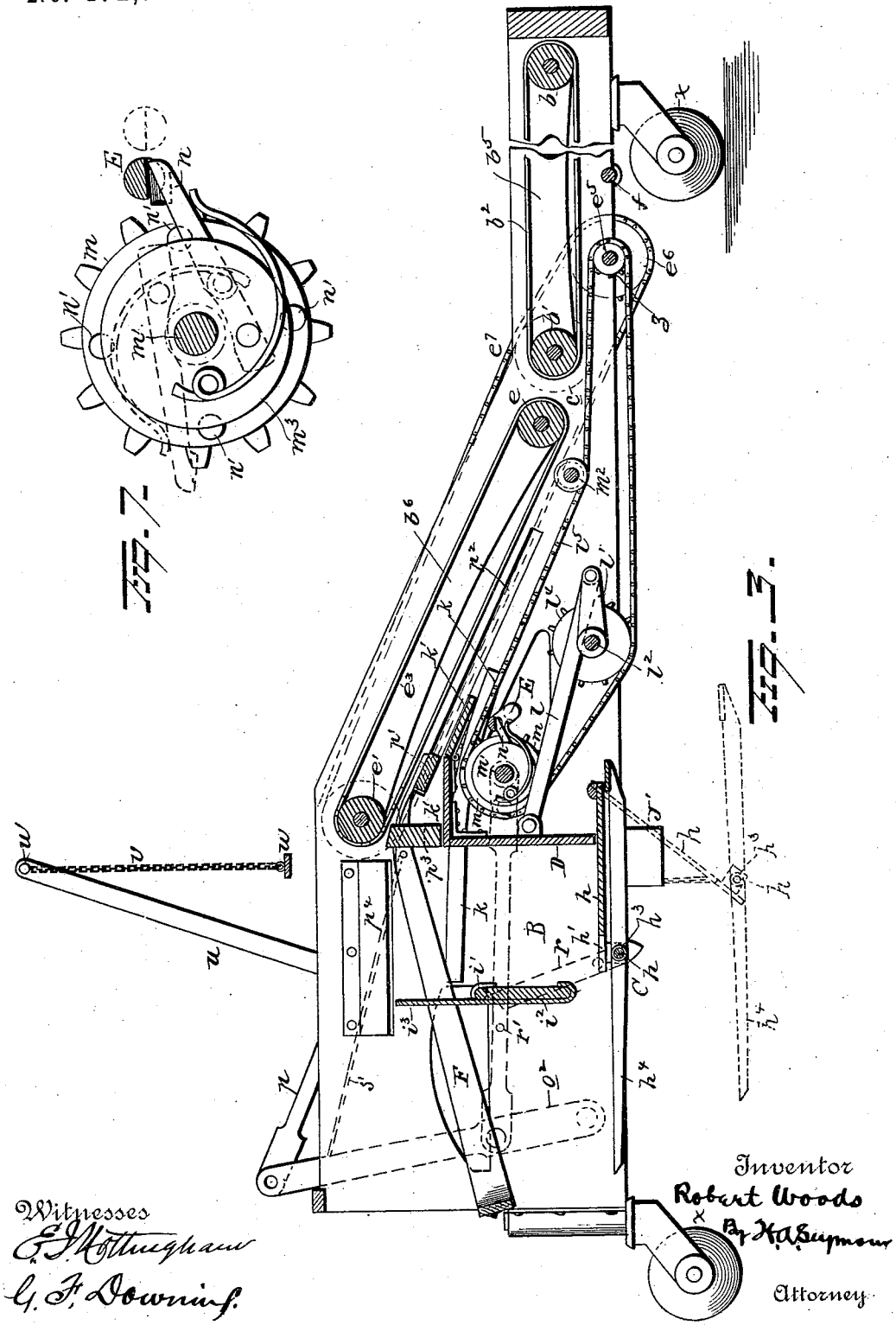
Figure 4:
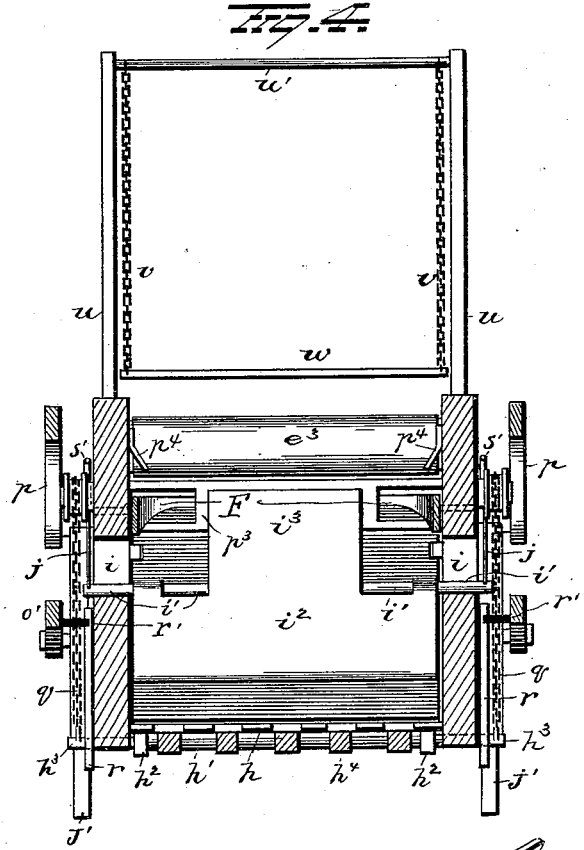
Figure 5:
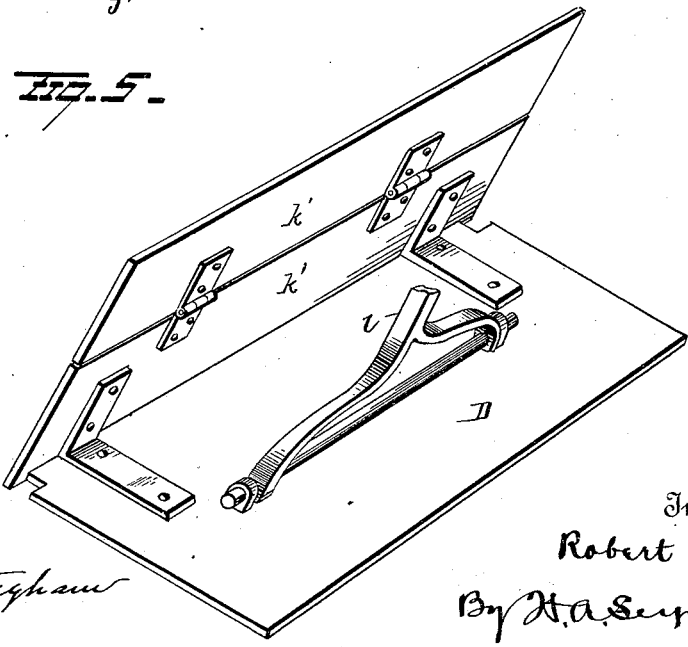

In the accompanying drawings, Figure 1 is a plan view of the device. Fig. 2 is a side elvation. Fig. 3 is a sectional view on the line *x x* of Fig. 1. Fig. 4 is a view on the line *y y* of Fig. 1. Fig. 5 is a detail view of packer D. Fig. 6 is an enlarged detail of a part of the gearing. Fig. 7 is a view in elevation of the same. Fig. 8 is a detached view of bottom C, and Fig. 9 is a detail.

A represents a frame, the rear portion of which constitutes a box B. From the top of the box B the sides *a a* of the main frame are inclined on their tops and terminate in rectangular arms or extensions $a'$. Mounted in the arms or extensions $a'$ at each end thereof are rollers $b\ b'$, over which an endless belt $b^2$ is adapted to pass, said belt being supported at its edges by means of suitable strips $b^5\ b^5$. One journal of the roller $b'$ is extended beyond its bearings and is provided with a sprocket-wheel $c$, over which a sprocket-chain $e^7$ is adapted to pass, as hereinafter explained. A clutch-sleeve $d$ is mounted to slide on the journal of the roller $b'$ and adapted to engage a clutch-cheek on the hub of the sprocket-wheel $c$, whereby said sprocket may be made to rotate with the shaft when desired. A lever $d'$ is connected to the extension or arm $a'$ and is adapted to carry the clutch-sleeve $d$, the rear end of said lever being provided with a perforation for the passage of a pin $d^2$, projecting from the frame A, a spring $d^3$ being inserted between the lever and frame. A cord or rope $d^4$ is connected at one end to the lever $d'$ and passed through a loop on the frame A, the free end of said cord or rope being extended to a point convenient to the operator on the binder. By this means the operator may throw the endless belt $b^2$ into and out of action at will.

Journaled in the sides of the frame at the top and bottom of the inclined portions thereof are rollers $e\ e'$, over which an endless belt $e^3$ is adapted to pass, said belt being adapted to be supported at its edges by means of suitable strips $b^6\ b^6$, secured to the sides of the frame. The journal of the roller $e'$ is extended beyond its bearings and provided with a fixed sprocket-wheel $e^4$. A shaft $e^5$ is mounted in the extensions or arms $a'$ of the frame and is provided at one end with a sprocket-wheel $e^6$. The sprocket-wheels $e^4$ and $e^6$ are connected by a sprocket-chain $e^7$, said sprocket-chain also passing over the sprocket-wheel $c$, thus imparting motion to the endless belt $b^2$. At the other end of the shaft $e^5$ a pinion $f$ is secured thereto, and in proximity to said shaft $e^5$ is a shaft $f'$, to which a pinion $f^2$ is secured and adapted to mesh with the pinion $f$. On the other end of the shaft $f'$ a master-wheel may be secured by which motion may be imparted to the gearing, or motion may be imparted to said gearing in any other suitable manner.

The bottom of the box B is adapted to be movable to release or discharge the contents of said box and in forming said bottom C of the box, a plate $h$ is pivoted at its rear edge between the sides $a$ of the frame and adapted to extend rearwardly, being provided at its rear edge with a series of notches $h'$. On the under face of the plate $h$ perforated lugs $h^2$ are formed for the reception of a rod $h^3$, whereby a series of fingers $h^4$ is pivotally connected to said plate, said fingers extending forwardly from their connection with the plate $h$ and connected by a cross-bar and also extending rearwardly from said connection with the plate $h$. By this construction the bottom of the box B when released, as hereinafter explained, will be permitted to swing downwardly, and the series of fingers $h^4$ will also be permitted to turn on the rod $h^3$ and enter the notches in the rear edge of the plate $h$.

The sides of the box B are provided with slots $i$ for the reception of the ends of a rod $i'$, which rod supports and carries a tail-board $i^2$, the lower portion of said tail-board being adapted to extend completely across the box, while the top portion of said tail-board is contracted to produce an arm or projection $i^3$. Boxes or cases $j$ are secured to the sides of the box B for the reception of weights $j'$. Cords $j^2$ are connected at one end to the weights $j'$ and passed over pulleys $j^3$ at the tops of the boxes $j$, said cords being secured at their opposite ends to the rod $i'$. By this means the tail-board will be maintained in contact with the grain in the box B with a yielding pressure.

Secured to the inner faces of the sides of the frame and extending into the box B for some distance are ways $k$ for the reception of the ends of two plates $k'$, which are hinged together so as to ride upon the inclined as well as the horizontal portions of the guides or ways $k$, or, more properly speaking, so as to ride over the angle formed by said ways. Secured to and projecting downwardly from the rear plate $k'$ is a plate or packer D. Pivotally connected to the front face of the plate D is a pitman $l$, the other end of which is connected with the crank-arm $l'$ of the shaft $l^2$, mounted in the sides of the frame A. A sprocket-wheel $l^4$ is secured to the shaft $l^2$, which is adapted to receive motion from a sprocket-chain $l^5$, which drive-chain is passed over a sprocket-wheel $z$ on the shaft $e^5$ and a sprocket-wheel $m$, mounted loosely on a shaft $m'$, said drive-chain being passed under a pulley mounted loosely on a shaft $m^2$ to prevent it from conflict with the conveyer-belts. By this means reciprocating motion will be imparted to the packer D, whereby the grain will be packed in the box against the tail-board. Secured to and carried by the shaft $m'$ in proximity to the sprocket-wheel $m$ is a disk $m^3$, to which a spring-actuated dog $n$ is connected, said dog when released being adapted to be engaged by one of a series of pins or projections $n'$ on one face of the sprocket-wheel $m$. A spring-bar or trip-lever E is secured at one end to one side of the frame A and extends at its other end through an opening in the other side of the frame. At a point between its ends the bar or trip-lever E is bent and adapted to lie normally in the path of the dog $n$ and prevent it from engagement with the projections $n'$ on the sprocket-wheel $m$. To the free end of the trip-lever E a cord $n^2$ is attached, said cord being passed through a suitable eye or loop on the frame and extended to a point within easy reach of the operator, whereby he may be enabled to operate the trip-lever E manually. Each end of the shaft $m'$ is provided with crank-arms $o$, to which pitman-rods $o'$ are connected. The rear ends of the pitman-rods $o'$ are pivotally connected to two upright arms $o^2$, which latter are pivotally connected in suitable brackets $o^3$, secured to the box B. To the upper ends of the upright arms $o^2$ rods $p$ are pivotally connected and, extending forwardly and downwardly, are connected at their forward ends to the ends of a cross-bar $p'$, which latter extends across the diagonal position of the frame A and is adapted to slide in elongated slots $p^2$. Secured to this cross-bar are the ends of a strap F, which are adapted to pass through slots in a bar $p^3$, secured in the box B immediately beneath the upper roller of the endless belt $e^3$, said strap extending rearwardly through the box to the rear end thereof. Guide-plates $p^4$ are secured to the inner faces of the sides of the box near their tops, said guide-plates being adapted to force the stubs of the grain inward far enough to insure their passage inside of the strap F. The strap F is of leather or other flexible material and for the purpose of forcing the bundles of grain forwardly against the packer and in the forward end of the box during the operation of discharging them. Connected at one end to the upright arms $o^2$ at points between their ends are chains or cords $q$, which after passing over suitable pulleys are secured to the ends of the rod $h^3$, carried by the bottom C, said bottom being normally supported by the engagement of the hooked ends of gravity-latches $r$ with the ends of the rod $h^3$, said gravity-latches being pivotally connected to the sides of the box B and adapted to be released from engagement with the rod $h^3$ by pins $r'$, projecting from the pitmen $o'$, when the mechanism for discharging a shock is released or tripped. Thus it will be seen that when the trip-lever E is operated and the shaft $m'$ caused to rotate the strap F will be drawn forward to force the shock of grain toward the forward end of the box B, and at the same time the pitman $o'$ will move forwardly and cause the pins $r'$ to engage the gravity-latches $r$, and thus release the bottom C, whereupon the weight of the grain will cause said bottom to turn, and thus discharge its load. The bottom C is so constructed that it drops to the ground and remains in this position until the machine is drawn clear of the shock. The tail-board, being pivoted on the rods $i'$, tilts over the shock and releases the strap from the shock, and the weights, being only a little heavier than the tail-board, draw the latter forward. As the crank-shaft $m'$ continues to rotate, the parts will be returned to their normal positions and the latches automatically engage the rod $h^3$ of the bottom C. Connected to the rear portion of the strap F for the purpose of supporting and carrying it outward are cords $s$, which pass through loops $s^3$ $s^3$ at the outer ends of the frame and through loops $s^4$ $s^4$ on the outside of the frame and thence backward again to the arms $o^2$, where they are secured. In this manner it will be seen that the strap is drawn outward by the outward movement of arms $o^2$ and that the strap is carried in the opposite direction by the opposite movement of the arms $o^2$. Cords $s'$ are preferably connected at one end to the strap near its forward ends and at their other ends to the arms $o^2$. To render the operating of the trip mechanism of the discharging devices automatic, a cord $t$ is secured to the box B and passed across one (or both) of the slots in the sides of the box through which the rod $i'$ of the tail-board $i^2$ passes, said cord being then passed through suitable eyes or loops and finally connected to the free end of the trip-lever E. By this arrangement it will be seen that when a sufficient number of bundles of grain shall have entered to force the tail-board back to the cord $t$ the end of the rod $i'$ will come into contact with said cord and force it back, and thus operate the lever E to set the discharge mechanism in motion.

Extending upwardly and slightly forwardly from the top edges of the box B are two uprights $u$ $u$, connected at their tops by a cross-bar $u'$. Connected to and depending downwardly from the cross-bar $u'$ are chains $v$, which terminate a short distance from the top of the box B and are connected by a bar $w$.

With the machine constructed as above described the endless belt $b^2$ will only be in motion when the clutch mechanism on the journal of the roller $b'$ is operated by the driver, while the endless belt $e^3$ will be continually in motion during the operation of the machine.

The machine is adapted to be placed close to and run with the binding apparatus, so that the bundles of grain from the binding apparatus will be discharged from the binder onto the belt $b^2$. When the proper number of bundles shall have been deposited on the endless belt, $b^2$ (usually three or four,) the clutch mechanism will be operated and said belt set in motion. The bundles of grain will be then delivered onto the inclined belt $e^3$ and conveyed by it to the box B. When the bundles reach the top of the belt conveyer $e^3$, (heads first,) their heads will come into contact with the suspended bar $w$, and by said bar the bundles will be made to turn upwardly and be deposited in the box B in a standing position. When the bundles of grain are accumulating in the box B, the packer D will be operating to back them against the tail-board, and when a sufficient number of bundles have been accumulated in the box B to cause the rod $i'$ of the tail-board to engage the cord $t$ the trip-lever E will be operated, as above explained, to release the dog $n$ and cause it to rotate with the sprocket-wheel $m$, thus rotating the crank-shaft $m'$, the rotation of which will cause the pin $r'$ on the pitman $o'$ to engage the gravity-lever to actuate the gravity latches to release the pivoted bottom C, and thus discharge the shock of grain and permit said shock to rest on the ground in a standing position. The rotation of crank-shaft will cause the discharging mechanisms to return to their normal position, as previously explained. The machine will be provided with suitable carrying-wheels x.

It is evident that numerous slight changes might be made in the details of construction of my invention without departing from the spirit thereof or limiting its scope. Hence I do not wish to limit myself to the precise details of construction herein set forth; but, Having fully described my invention, what I claim as new, and desire to secure by Letters Patent, is—

1. The combination, with suitable conveyers and a box or receptacle, of a bar suspended immediately beyond the upper end of the conveyers for directing bundles of grain into said box or receptacle and causing them to stand upright therein, substantially as set forth.

2. The combination, with suitable conveyers and a receptacle, of a bar suspended immediately beyond the upper end of the conveyers for directing bundles of grain therein in an upright position, and means for automatically compressing said bundles of grain into a shock, substantially as set forth.

3. The combination, with suitable conveyers and a receptacle, of a bar suspended immediately beyond the upper end of the conveyers for directing bundles of grain into said receptacle in an upright position, means for automatically compressing said bundles of grain, and means for automatically releasing the shock thus formed, substantially as set forth.

4. The combination, with suitable conveyers and a receptacle, of a bar suspended immediately beyond the upper end of the conveyers for directing bundles of grain into the receptacle in an upright position, means for automatically compressing it into a shock, devices for automatically releasing said shock, and means for automatically resetting said releasing or discharging mechanism, substantially as set forth.

5. In a grain carrier and shocker, the combination, with a box or receptacle, of a pivoted bottom therein, latch for maintaining said bottom locked when closed, a pivoted arm, a flexible connection between said arm and pivoted bottom, a crank-shaft, a pitman connecting said crank-shaft with the pivoted arm, and a pin on the pitman to engage said latch to release the pivoted bottom, substantially as set forth.

6. In a bundle carrier and shocker, the combination, with a box or receptacle, of a bottom pivoted therein, latches for normally locking said bottom closed, a pivoted arm, a crank-shaft, a pitman connecting the crank-shaft and pivoted arm, a pin carried by the pitman to engage the latch to release the pivoted bottom, a loose wheel on the crank-shaft, means for communicating motion to said wheel, and means for causing said wheel to rotate with the crank-shaft, substantially as set forth.

7. In a bundle carrier and shocker, the combination, with a box or receptacle, of a pivoted bottom therein, latches for locking said bottom normally closed, a pivoted arm, a crank-shaft, a pitman connecting said pivoted arm and crank-shaft, a pin carried by said pitman to engage the latch to release the pivoted bottom, a wheel loosely mounted on the crank-shaft, a disk carried by the crank-shaft, a dog carried by said disk and adapted to engage said wheel, means for transmitting motion to said wheel, and a tripping-lever for maintaining said dog normally out of contact with the wheel, substantially as set forth.

8. In a bundle carrier and shocker, the combination, with a box or receptacle, of a crank-shaft, a pivoted arm, a pitman connecting said pivoted arm and crank-shaft, a cross-bar constructed to slide in the frame of the machine, a rod connecting the pivoted arm and cross-bar, and a strap located in the box or receptacle and connected at its ends to said cross-bar, substantially as set forth.

9. In a bundle carrier and shocker, the combination, with a box or receptacle, of a crank-shaft, a pivoted arm, a pitman connecting the pivoted arm and crank-shaft, a cross-bar, an arm or rod connecting said cross-bar with the pivoted arm, a strap in the box or receptacle, said strap being connected to the cross-bar and adapted to force the bundles of grain in the forward end of the box or receptacle, and a cord connecting the rear portion of said strap with the pivoted arm, substantially as set forth.

10. In a bundle carrier and shocker, the combination, with a receptacle and a tail-board, of a pivoted bottom, latches for locking said bottom normally closed, a crank-shaft, means connected with said crank-shaft for releasing the latches, a wheel loosely mounted on said crank-shaft, means for conveying motion to said wheel, a dog adapted to engage said wheel, a trip-lever for maintaining said dog normally out of contact with the wheel, and a flexible connection between the tripping-lever and the box or receptacle and terminating in line with the support of the tail-board, substantially as set forth.

11. In a bundle carrier and shocker, the combination, with a box, of a pivoted bottom therein, said bottom comprising a plate pivoted to the box, and a series of fingers connected together and pivotally supported between their ends by said plate, substantially as set forth.

12. The combination, with a box or receptacle, of a tail-board having a pivotal and sliding connection in the box or receptacle and means attached to the tail-board for automatically returning it to its normal position, substantially as set forth.

13. In a bundle carrier and shocker, the combination, with a frame comprising a box or receptacle and forward extensions therefrom, of two endless belts, one adapted to rotate periodically and the other continuously, and a bar suspended over the entrance of said box or receptacle and adapted to be engaged by the grain from the continuously-operating endless belt and be caused to be deposited into the box or receptacle in an upright position, substantially as set forth.

14. In a bundle carrier and shocker, the combination, with a box or receptacle, of a strap located therein and encircling the space inclosed by the walls of the frame, means for operating said strap to force the grain in the forward part of the box, and guides located above said strap for guiding the sheaves within the strap, substantially as set forth.

In testimony whereof I have signed this specification in the presence of two subscribing witnesses.

ROBERT WOODS.

Witnesses:
 JAMES GARBUTT,
 OTTO EVANS.